United States Patent

Pan et al.

[11] Patent Number: 5,838,847
[45] Date of Patent: Nov. 17, 1998

[54] EFFICIENT ELECTROMECHANICAL OPTICAL SWITCHES

[75] Inventors: Jing-Jong Pan, Milpitas; Jing-Yu Xu, San Jose; Charlene Jia-Ling Yang, Fremont, all of Calif.

[73] Assignee: E-Tek Dynamics, Inc., San Jose, Calif.

[21] Appl. No.: 956,637

[22] Filed: Oct. 23, 1997

Related U.S. Application Data

[63] Continuation of Ser. No. 727,075, Oct. 8, 1996, Pat. No. 5,742,712.

[51] Int. Cl.$^6$ ................................................. G02B 6/26
[52] U.S. Cl. ................................. 385/18; 385/16; 385/20
[58] Field of Search ................................. 385/18, 16–25, 385/31

[56] References Cited

U.S. PATENT DOCUMENTS

| | | | |
|---|---|---|---|
| 4,355,864 | 10/1982 | Soref | 350/96.18 |
| 4,566,753 | 1/1986 | Mannschke | 350/96.16 |
| 4,730,891 | 3/1988 | Poorman | 350/96.21 |
| 5,050,954 | 9/1991 | Gardner et al. | 385/16 |
| 5,359,683 | 10/1994 | Pan | 385/22 |
| 5,361,315 | 11/1994 | Lewis et al. | 385/16 |
| 5,420,946 | 5/1995 | Tsai | 385/22 |
| 5,436,986 | 7/1995 | Tsai | 385/16 |
| 5,566,260 | 10/1996 | Laughlin | 385/16 |
| 5,642,447 | 6/1997 | Pan et al. | 385/21 |
| 5,652,814 | 7/1997 | Pan et al. | 385/24 |
| 5,742,712 | 4/1998 | Pan et al. | 385/18 |

*Primary Examiner*—Phan T. H. Palmer
*Attorney, Agent, or Firm*—Townsend and Townsend and Crew LLP

[57] ABSTRACT

The present invention provides improved optic switches in which the optic fibers and optical pathways need not move. Advantageously, the switches of the present invention generally rely on a combination of a moveable reflective element and at least one fixed collimating lens. The collimating lens typically expands the light signal from a single mode fiber to a substantially larger optic path. When the reflective element is disposed out of this large optic path, the light signals continue on to a first output fiber, often through another collimating lens. However, when the reflective element is disposed within the expanded optic path from the collimating lens, the signal is reflected back through that same collimating lens into an alternative output fiber which is parallel and in close proximity to the input fiber. Conveniently, the reflective element can move across the optic path without changing the position of the input or output fibers relative to each other. Surprisingly, a thin planar reflector which is aligned to reflect one of a pair of signals crossing between two collimating lenses can also reflect the other crossing signal, thereby providing highly efficient multiple signal switching. Hence, by carefully locating a number of optic fibers parallel to each other about the center line of the collimating lens, a wide variety of highly efficient, multiple input and multiple output switching structures can be constructed.

8 Claims, 7 Drawing Sheets

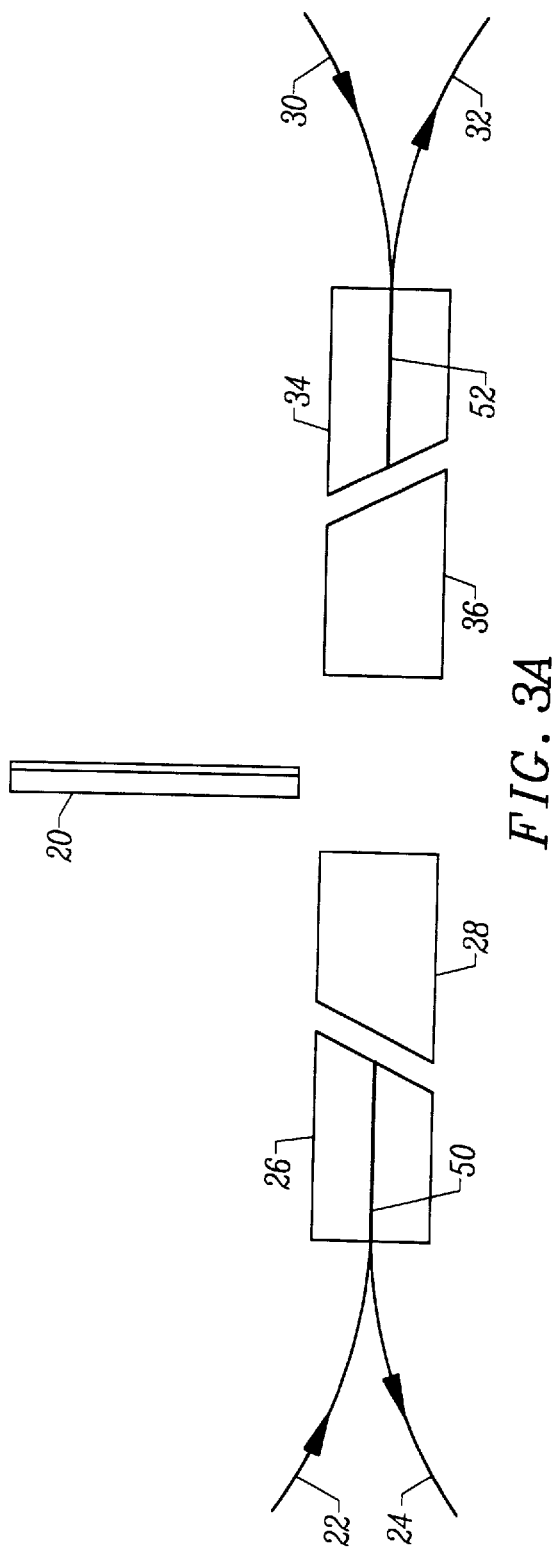
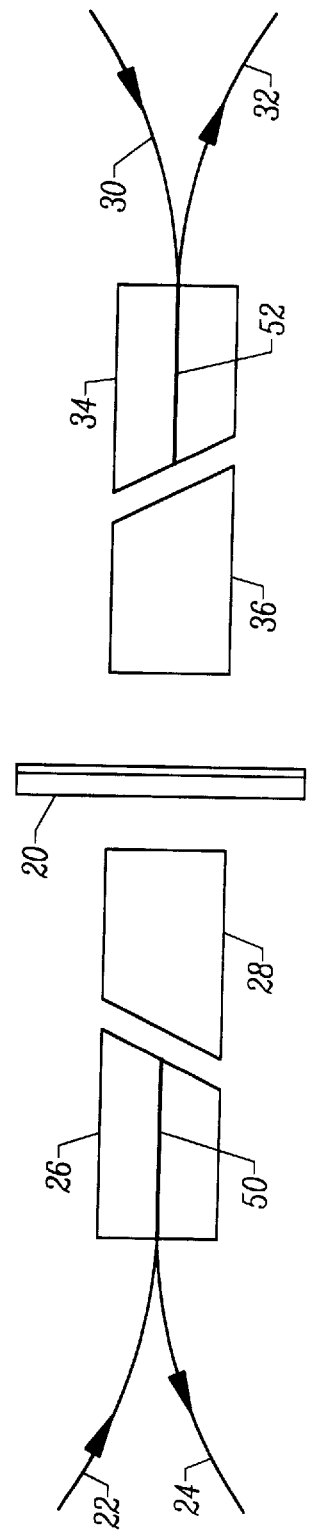
FIG. 3A
FIG. 3B

| No. | Distance (L mm) | Insertion Loss (dB) |
|---|---|---|
| 1 | 0.15 | 0.37 |
| 2 | 0.785 | 0.51 |
| 3 | 1.42 | 0.73 |
| 4 | 2.055 | 1.1 |
| 5 | 2.69 | 1.6 |

5,838,847

EFFICIENT ELECTROMECHANICAL OPTICAL SWITCHES

CROSS REFERENCE TO RELATED APPLICATION

The present application claims the benefit of priority from, and is a continuation of, U.S. patent application Ser. No. 08/727,075, filed Oct. 8, 1996, now U.S. Pat. No. 5,742,712, the full disclosure of which is incorporated herein by reference.

BACKGROUND OF THE INVENTION

The present invention is generally related to optic fiber networks, and in particular, provides switches for directing optical signals along selected fibers of an optical network.

In fiber optic networks, light signals are transmitted along optical fibers to transfer information from one location to another. Although the propagation of light signals along optical fibers is analogous to the transmission of electronic data along metal wires, transferring the light signals from an input optical fiber to any of a plurality of output optical fibers is somewhat more problematic than the electrical coupling of wires in an electrical switch.

Electrical signals which are sent along a wire naturally propagate between input and output wires which are electrically coupled together. In contrast, a light signal must be accurately entered into an optical fiber, or much of the signal strength will be lost. Modern optical fibers are very small in cross-section, and typically have a fairly narrow acceptance angle within which light entering the fiber must fall to promote efficient propagation of the light along the fiber. Therefore, optic switches which accept light from an input optical fiber, and which selectively couple that light to any of a plurality of output optical fibers must transfer that light with precise alignment. The alignment requirements of modern single mode optic fibers are particularly stringent, as their core diameters are typically as small as 2 to 10 micrometers.

In electromechanical optical switches, the switching operation is typically effected by the movement of the ends of the input optical fibers relative to the ends of each of the output optical fibers. To form an optical path, the end of the input and output fibers must align with sufficient accuracy to avoid excessive loss of the signal therebetween. These accuracy requirements greatly increase the cost and complexity of such switches.

Another disadvantage of known optic switches is the need to mechanically move the input optic fibers relative to the output optic fibers. As described above, the fibers themselves are quite thin and may be subject to breakage if not properly protected. On the other hand, reinforcing the fibers with stiff protective sheaths makes the fibers less flexible, increasing the force required to manipulate each fiber into alignment. When it is desired to provide switches which accommodate multiple input and output fibers simultaneously, the delicacy and complexity of maintaining accurate alignment for each optic path greatly increases the cost of the switch.

Alternative optical switch structures which split the signal strength in half and selectively block the undesired pathway are highly inefficient, requiring repeated (and costly) signal amplification. These disadvantages are compounded in optical switches which provide multiple alternative pathways with simultaneous switching, such as in 2×2 switches, dual 1×2 switches, and dual 2×2 switches.

For the above reasons, it is desirable to provide improved optic switches in a variety of switching arrangements. It would be particularly desirable to provide optic switches having high optical efficiency, but which did not require precise alignment, or even movement of the optic fibers themselves.

SUMMARY OF THE INVENTION

The present invention provides improved optic switches in which the optic fibers and optical pathways need not move. Advantageously, the switches of the present invention generally rely on a combination of a moveable reflective element and at least one fixed collimating lens. The collimating lens typically expands the light signal from a single mode fiber to a substantially larger optic path. When the reflective element is disposed out of this large optic path, the light signals continue on to a first output fiber, often through another collimating lens. However, when the reflective element is disposed within the expanded optic path from the collimating lens, the signal is reflected back through that same collimating lens into an alternative output fiber which is parallel and in close proximity to the input fiber. Conveniently, the reflective element can move across the optic path without changing the position of the input or output fibers relative to each other. Surprisingly, a thin planar reflector which is aligned to reflect one of a pair of signals crossing between two collimating lenses can also reflect the other crossing signal, thereby providing highly efficient multiple signal switching. Hence, by carefully locating a number of optic fibers parallel to each other about the center line of the collimating lens, a wide variety of highly efficient, multiple input and multiple output switching structures can be constructed.

In a first aspect, the present invention provides a switch for controllably coupling optical fibers, the switch comprising a first input optical fiber, a first output optical fiber, a second output optical fiber, and a first sleeve. The first sleeve has an end-face, a longitudinal axis, and an aperture parallel to the longitudinal axis through the end-face. The aperture fittingly receives a plurality of optical fibers including the first input fiber and the first output fiber. A first collimating lens is disposed in a path of the first light signal from the first input fiber. An at least partially reflective element is movable between a first position and a second position. The movable reflector in the first position is disposed in the path of the first signal from the collimating lens, and is aligned to reflect that first signal back through the first collimating lens and into the first output fiber. The movable reflector in the second position is disposed out of the path of the first signal so that the first signal from the collimating lens passes into the second output fiber.

In some embodiments, the second output fiber is fittingly disposed in the aperture of the first sleeve with the first input fiber and the first output fiber, while a fixed reflector returns the first signal through the first collimating lens when the movable reflector is out of optical path. Alternatively, the unobstructed first signal may pass through a second collimating lens that focuses the first signal. When the second collimating lens is included, the switch can easily accommodate an additional input optic fiber so that a second light signal is also passed or reflected by the movable reflector simultaneously with the first light signal.

In another aspect, the present invention provides a switch for controllably coupling two input optical fibers to two output optical fibers, the coupler comprising a first sleeve having an end-face, a longitudinal axis, and an aperture parallel to the longitudinal axis through the end-face. The aperture matches the end sections of a first input optical fiber and a first output optical fiber so that these end sections are snugly held in the aperture. The first sleeve end-face is co-planar with the ends of the first input optical fiber and the first output optical fiber, and is angled with respect to a plane perpendicular to the longitudinal axis. A first GRIN lens is disposed in front of the first sleeve end-face. The first GRIN lens has an end-face displaced from, and in close proximity to, that first sleeve end-face, and is reciprocally angled thereto.

A second sleeve also has an end-face, a longitudinal axis, and an aperture parallel to the longitudinal axis through the end-face. The aperture of the second sleeve matches end sections of a second input optical fiber and a second output optical fiber so that these end sections are snugly held in the aperture. The second sleeve end-face faces the first sleeve end-face, and is co-planar with ends of the first input optical fiber and the second output optical fiber, and is angled with respect to a plane perpendicular to the longitudinal axis. A second GRIN lens is in front of the second sleeve end-face, the second GRIN lens having an end-face displaced from, and in close proximity to, the second sleeve end-face, and is reciprocally angled thereto.

The first sleeve, the first GRIN lens, the second sleeve, and the second GRIN lens are aligned with respect to each other such that the second GRIN lens focuses light signals from one of the input optical fibers into one of the output optical fibers, and from the other of the input optical fibers into the other of the output optical fibers. A mirror is movable between the first and second GRIN lenses to reflect the light signals from the one of the input optical fibers to the other of the output optical fibers, and from the other of the input fibers to the one of the output fibers.

BRIEF DESCRIPTION OF THE DRAWINGS

FIGS. 3A and B schematically illustrate the 2×2 switching effect provided by the electromechanical optical switch of FIG. 1.

DETAILED DESCRIPTION OF THE SPECIFIC EMBODIMENTS

Figure 1:
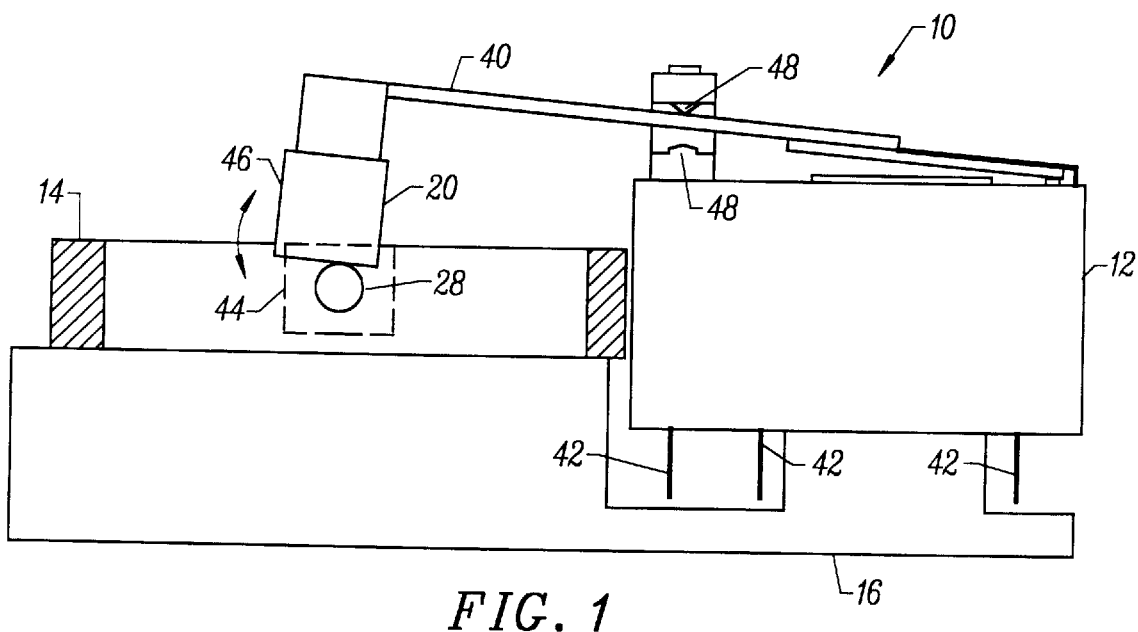
FIG. 1 is a cross-sectional side view of an electromechanical 2×2 switch according to the principles of the present invention, in which a portion of the switch body has been removed to show the interaction of the movable reflective element and one of the collimating lenses.
Figure 2:
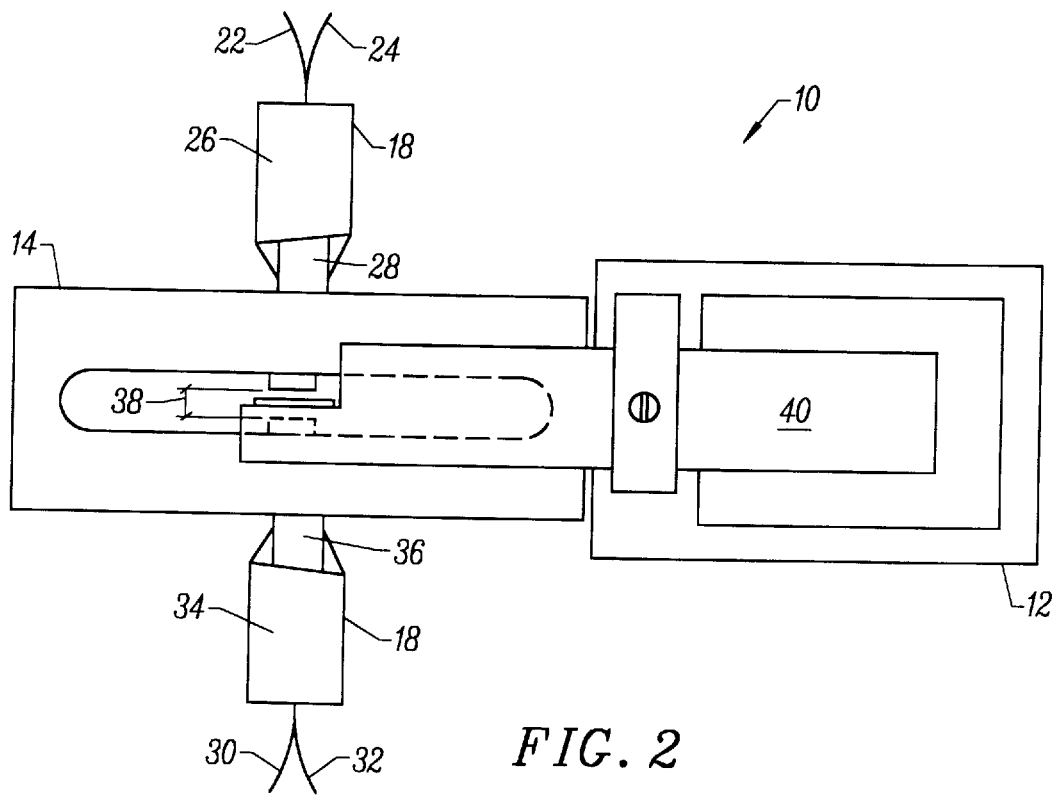
FIG. 2 is a plan view of the electromechanical optical switch of FIG. 1, and illustrates the arrangement of the sleeve assemblies within the switch body for this 2×2 embodiment.

Referring first to FIGS. 1 and 2, 2×2 electromechanical optical switch 10 comprises a relay 12 which is held in a fixed position relative to switch body 14 by a support base 16. Switch body 14, in turn, holds two sleeve assemblies 18 in alignment, while relay 12 effects movement of mirror 20.

One of the sleeve assemblies maintains alignment between a first input fiber 22 and a first output fiber 24 within an aperture of a first sleeve 26, and also with a first GRIN (GRaded INdex) lens 28. The other sleeve assembly maintains alignment between a second input fiber 30, a second output fiber 32, and a second GRIN lens 36 by restraining the optical fibers within a second sleeve 34. First and second GRIN lenses 28, 36 are affixed within switch body 14 in axial alignment, and with a gap 38 therebetween.

Relay 12 includes an arm 40 which supports mirror 20. In response to electrical signals supplied at connectors 42, arm 40 of relay 12 moves mirror 20 between a first position 44 (shown in phantom) and a second position 46. Mirror 20 in second position 46 is clear of the optical path between first GRIN lens 28 and second GRIN lens 36. On the other hand, when mirror 20 is disposed in first position 44, it blocks transmission of optical signals between the GRIN lenses. Moreover, optical signals which enter the first GRIN lens 28 through the first input optical fiber 22 are reflected by mirror 20 back through the first GRIN lens, which focuses those signals upon the first output optical fiber 24. The other side of mirror 20 also reflects optical signals from second input fiber 30 back through second GRIN lens 36 and onto the second output fiber 32.

The travel of arm 40 is limited by stops 48, which thereby determine the first and second positions of mirror 20. However, as the arm 40 of relay 12 moves mirror 20 substantially parallel to its reflective surfaces, the location of stops 40 need only be precise enough to ensure that the optical path between the GRIN lens is fully open or fully blocked in the first and second positions. Additionally, this in-plane movements helps to minimize the size of gap 38 required between the GRIN lenses, as can be understood with reference to FIG. 2.

FIGS. 3A and B are schematic cross-sectional views of the switch of FIG. 1. In FIG. 3A, mirror 20 is clear of the optical path between first and second GRIN lenses 28, 36. The end sections of input fiber 22 and output fiber 24, which are preferably not fused together, are snugly held in an opening 50 through the longitudinal axis of glass sleeve 26. Similarly, the end sections of second input fiber 30 and second output fiber 32 are snugly held in an aperture 52 through the longitudinal axis of second glass sleeve 34. Each sleeve has a slant-angled face which is in close proximity with a reciprocally slanted face of a quarter pitch GRIN lens. The end sections of the input and output optical fibers are unjacketed. The core and cladding of each fiber are exposed, and the exposed cladding and core may or may not be tapered.

Figure 4:
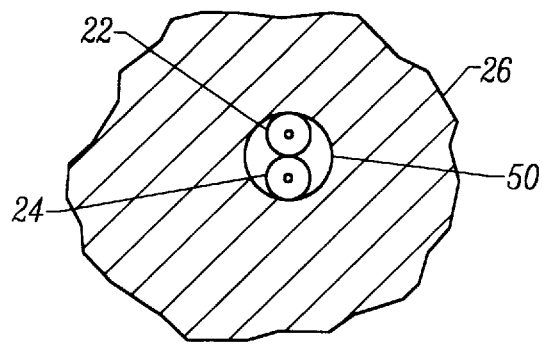
FIG. 4 illustrates the arrangement of optical fibers within an aperture of one of the sleeves of the electromechanical optical switch of FIG. 1.

FIG. 4 is a detailed cross-sectional end view of the aperture 50 in sleeve 26. In this example, the end sections of fibers 22 and 24 are untapered, and hence, the cross-sectional diameter of each of these single mode fibers is typically about 125 microns. The diameter of aperture 50 is about 250 microns to snugly accommodate the fibers. Similarly, the cross-sectional diameter of opening 52 in second sleeve 34 is 250 microns to accommodate the untapered end sections of the second input fiber 30 and second output fiber 32.

Figure 4A:
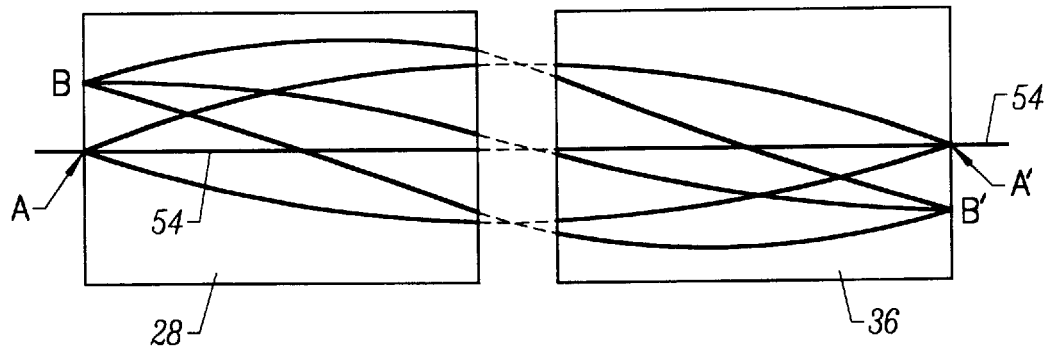
FIGS. 4A and B illustrate the reflection of two crossing light signals between the collimating lenses of the switch of FIG. 1 with a single thin planar reflector element.

When mirror 20 is not in the optical path between the first and second GRIN lenses, light from the first input fiber 22 is collimated by the first GRIN lens 28. The collimated light is refocused by the second GRIN lens 36 at the end of the second output fiber 32. Similarly, light from the second input fiber 30 is collimated and expanded by the second GRIN lens 36, and is refocused on the end of the first output optical fiber 24 by the first GRIN lens 28. As is more fully explained in co-pending U.S. patent application Ser. No. 08/623,489, filed Mar. 28, 1996 (Attorney Docket No. 13011-002310) now abandoned, the full disclosure of which is hereby incorporated by reference, the GRIN lenses do not mix the light signals from the first and second input fibers into the first and second output fibers. With reference to FIG. 4A, the two quarter pitch GRIN lenses 28 and 36 may be considered as a half pitch GRIN lens which has been split into two equal parts. The GRIN lenses share a common longitudinal axis 54, and a point source of light A at one end surface which is on axis 54 will appear at a point A prime at the opposite end surface of the lens, A prime also being on the axis 54. This is shown by tracing of rays from point A to point A'. A point B at one surface of the lens which is slightly off the longitudinal axis 54 will appear at a point B' at the opposite surface of our combined GRIN lenses, B' being equally removed from, but on the other side of, the longitudinal axis 54. As illustrated in FIG. 4, the first input fiber 22 and the first output fiber 24 fits snugly into the aperture 50 through sleeve 26. The cladding of the fibers 22, 24 maintain a distance between the cores of these two fibers. Likewise, the second input fiber 30 and the second output fiber 32 fits snugly into a central aperture through the second sleeve 34, while the cladding of these two fibers maintain roughly the same distance between their respective cores.

The ends of the first input and first output fiber are generally arranged with respect to one end surface of the first GRIN lens 28 so that each end, and specifically the optical fiber core, is slightly removed from the longitudinal axis. Correspondingly, the ends of the second input fiber 30 and second output fiber 32 are also arranged with respect to the end surface of the second GRIN lens 34 so that each fiber end is slightly removed from the longitudinal axis, and more importantly, so that each is opposite to a corresponding first input/output fiber. The result is that light from the core of the first input fiber 22 is received by the core of the second output fiber 32, as the second output fiber is opposite the first input fiber relative to the longitudinal axis 54. Similarly, light from the second input fiber 30 is received by the first output fiber 24 which is opposite the longitudinal axis of the combined quarter pitch GRIN lenses. Hence, when mirror 20 is out of the optical path between the GRIN lenses, the light signal from the first input fiber is efficiently coupled to the second output fiber, while the light signal from the second input fiber is efficiently coupled to the first output fiber.

Figure 4B:
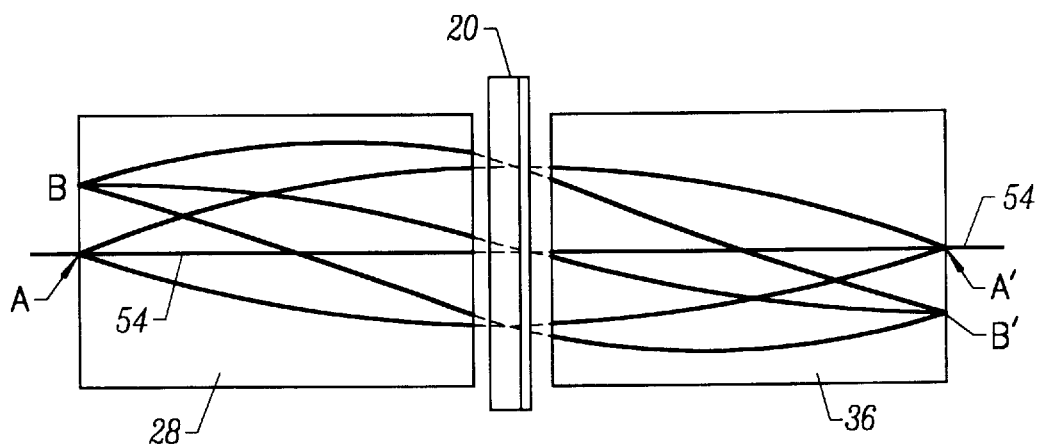

The operation of the switch of FIG. 1 when the mirror is disposed between the GRIN lenses may be understood with reference to FIGS. 3B and 4B. First with regard to the schematic cross-section of the switch shown in FIG. 3B, the arrangement of optical fibers, fiber ends, the surrounding sleeves, and the GRIN lenses need not be moved to effect switching. In fact, the only optical element which moves in the 2×2 switch of FIG. 1, is the movable mirror 20. Mirror 20 is generally a small, thin, two-sided mirror of conventional construction. Minimizing the weight of the mirror will keep the loads on the relay arm low.

As described above, the mirror moves substantially along the plane of its reflective surface. As illustrated in FIG. 4B, the mirror should be at an angle appropriate to reflect light signals from the location of the first input fiber core A to the location of the first output fiber core B. Such alignment of mirror 20 can be provided by moving the relay 12 relative to the switch body 14 and support base 16, by moving the switch body 14 relative to the support base 16 and relay 12, by bending arm 40 between mirror 20 and the remainder of the relay 12, or by some combination of these mechanisms. Regardless of the mirror alignment method used, so long as the mirror surface is planar and thin, and so long as the GRIN lenses and optical fibers provide efficient coupling between the first input and second output, and between the second input and first output fibers (as described regarding FIG. 4A), it will generally follow that properly aligning mirror 20 so as to reflect a light signal from the first input to the first output will also allow the mirror to reflect a light signal from the second input to the second output, as illustrated in FIG. 4B. It should be understood that such efficient switching provides substantial advantages over methods and mechanisms which merely block an undesired light signal particularly when a large number of switches are combined into a complex optic network system.

It should be noted that the explanation above of the positions of the fiber ends with respect to the longitudinal axis, as called for by the theoretical operation of the GRIN lenses, is an idealization. Empirically, it has been found that fine adjustments may still be required to achieve maximum performance of the switches of the present invention.

Figure 5A:
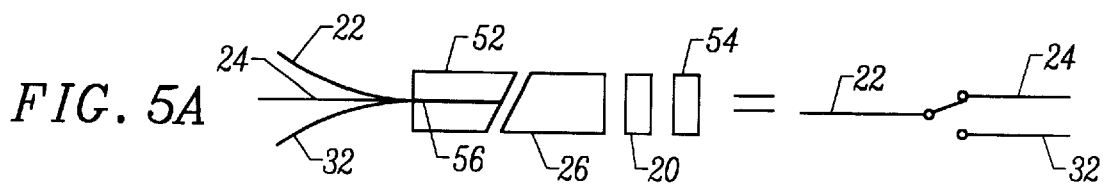
FIGS. 5A and B schematically illustrate an alternative 1×2 electromechanical optical switch in which a light signal is either reflected by a movable reflector element or by a fixed mirror.
Figure 5B:
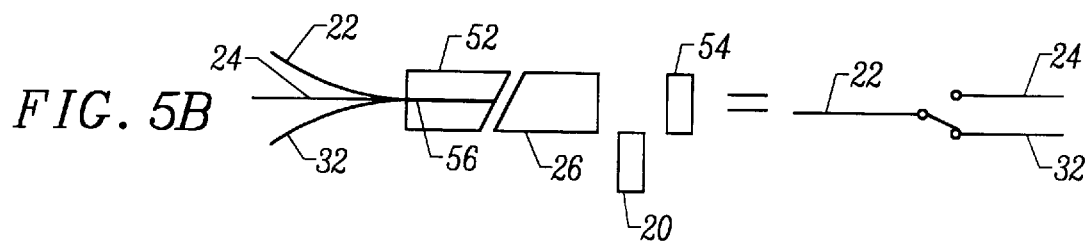
FIG. 5C illustrates the arrangement of input and output optical fibers within an aperture of the sleeve of the switch of FIGS. 5A and B.
Figure 5C:
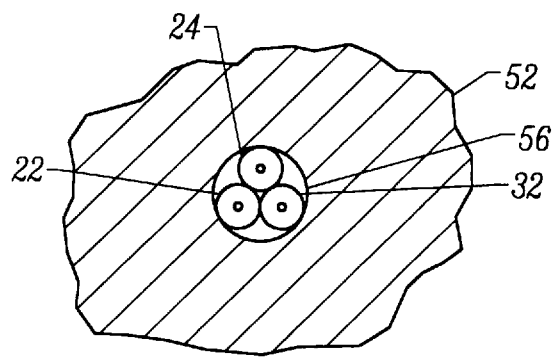

Referring now to FIGS. 5A through C, an alternative embodiment of an electromechanical optical switch makes use of a three-fiber sleeve 52 which fittingly receives first input fiber 22, first output fiber 24, and the second output fiber 32, all within a single central aperture 56 along the longitudinal axis of the sleeve. As before, mirror 20 reflects a light signal from first input fiber 22 back through the first GRIN lens 26 and onto an end of the first output fiber 24 when the mirror is disposed in the path of the optical signal from the first GRIN lens. In this embodiment, however, when the mirror 20 is moved out of the light signal from the GRIN lens, a stationary mirror 54 then reflects the light signal from the first input fiber 22, through first GRIN lens 26, and onto the second output fiber 32. While movable mirror 20 and fixed mirror 54 are generally independently aligned to reflect the light signals back to their desired targets, only the movable mirror 20 need be manipulated to effect switching. Thus, the 1×2 electromechanical optical switch of FIGS. 5A through C also requires movement of only a single optical element, allowing the fibers themselves to remain fixed in position, and providing the efficiency advantages of reflection (rather than simply blocking an undesired portion of a split signal) as described above.

Figure 6A:
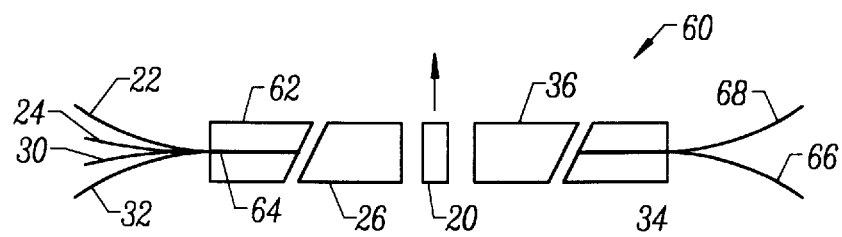
FIGS. 6A and B schematically illustrate an alternative electromechanical optical switch which provides simultaneous dual 1×2 switching.
Figure 6B:
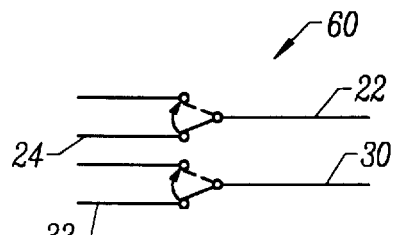
Figure 7:
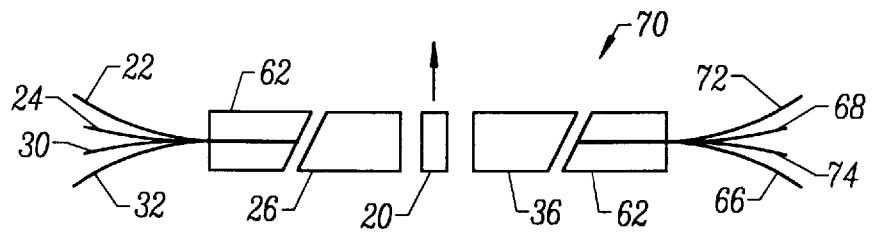
FIG. 7 schematically illustrates yet another alternative electromechanical optical switch, in which a movable reflector element provides simultaneous dual 2×2 switching.
Figure 8:
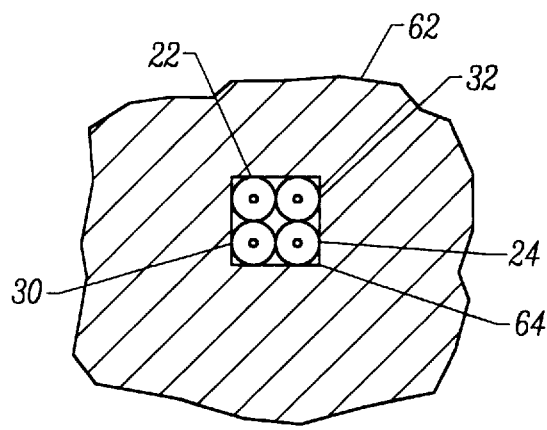
FIG. 8 illustrates the arrangement of four input and/or output optical fibers within an aperture of a sleeve of the switches shown in FIGS. 6A and 7.

Referring now to FIGS. 6A and B, yet another alternative embodiment of an electromechanical optical switch 60 provides a dual 1×2 switching action through the movement of a single mirror 20. In this embodiment, the first and second input fibers 22, 30, and the first and second output fibers 24, 32 are all disposed within a four-fiber sleeve 62 having a square aperture 64 along its longitudinal axis, as illustrated in FIG. 8. Mirror 20 is aligned to reflect the light signal from the first input fiber 22 to the first output fiber 24, and an alternative light signal from the second input fiber 30 to the second output fiber 32 when the movable mirror is disposed between the first and second GRIN lens 26, 36. Thus, both of the two input signals are expanded and collimated by the first GRIN lens 26, and are also focused back by that same first GRIN lens 26 when the movable mirror is in its first position.

When mirror 20 is moved to its second position out from between the GRIN lenses, the light signal from the first optical fiber 22 is focused by the second GRIN lens 36 upon a third output fiber 66. Similarly, with the mirror in this second position, the light signal from the second input fiber 30 passes to a fourth output optical fiber 68. The third and fourth output optical fibers 66, 68 are fittingly received within a second sleeve 34 as shown and described above with reference to FIG. 4. Once again, such an electromechanical optical switch provides a high degree of coupling efficiency between the input and output optical fibers, while only requiring movement of a single optical element.

In yet another embodiment, a dual 2×2 electromechanical optical switch 70 includes a structure similar to that of the dual 1×2 switch 60 described above, but here includes a second four-fiber sleeve 62 which holds a third input fiber 72 and a fourth input fiber 74, as well as the third output fiber 66 and fourth output fiber 68. The coupling of the first and second input and output fibers using the mirror 20 is as described above regarding dual 1×2 switch 60. Additionally, a third light signal from third input fiber 72 is reflected by mirror 20 to third output fiber 66. Similarly, a fourth input signal from a fourth input fiber 74 is coupled by mirror 20 to fourth output fiber 68. When mirror 20 is removed from between the first and second GRIN lenses, the first light signal from first input fiber 22 is coupled to the third output fiber 66, while the second signal from the second input fiber 30 passes to the fourth output fiber 68. Simultaneously, the third signal from the third input fiber 72 passes to the first output fiber 24, while the fourth signal from the fourth input fiber 74 is focused upon the second output fiber 32. Those with skill in the art will recognize that a wide variety of alternative switching arrangements could be provided by the switches of the present invention.

Figure 9A:
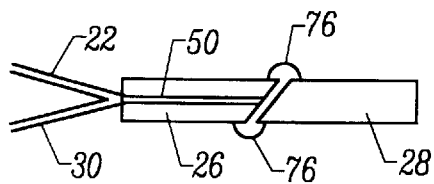
FIGS. 9A through C illustrate the structure of the sleeve and collimating lens assemblies, and also illustrate a method for producing the switch of FIG. 1.
Figure 9B:
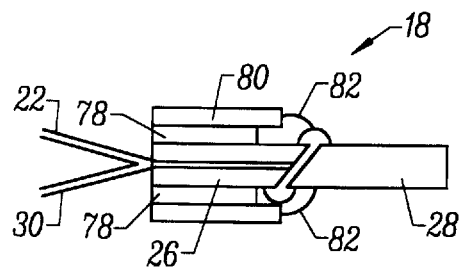
Figure 9C:
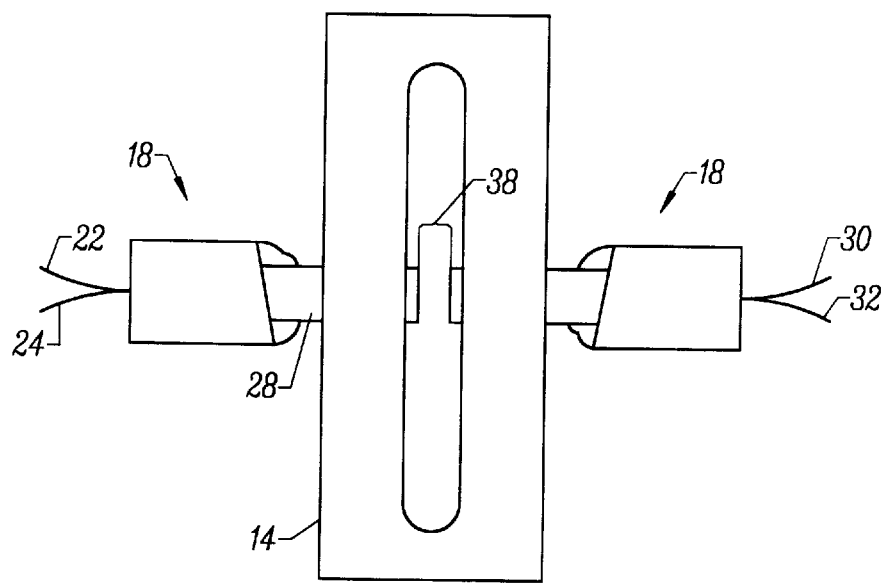

FIGS. 9A through C illustrate some of the steps useful in the manufacture of the switch shown in FIG. 1. In theory, the GRIN lenses used in the switches are quarter pitch, put in practice it has been found that 0.23 pitch offers better collimating performance. While standard lenses could also be used as collimators, it has been found that GRIN lenses provide better performance, easier manufacturing, and greater durability.

As shown in FIG. 9A, the back face of the GRIN lens 28 is polished at an angle, shown here at an exaggerated angle. Typically, the polish angle is 8 to 12 degrees from a flat surface perpendicular to the longitudinal axis of the GRIN lens 28. The end sections of the first input optical fiber 22 and the first output optical fiber 30 have had their protective jackets removed, and the core and cladding at the end sections of these fibers may be tapered or left untapered. (To taper the fiber end sections, the fiber ends are repeatedly dipped into a buffered HF solution.) The two ends of the fibers are then inserted into the quartz glass sleeve 26 which has a central opening 50 sufficiently large to accept the end sections of the two fibers. Initially, the ends of the fibers extend beyond the end of the sleeve 26, and are subsequently cut flush against the forward face of the sleeve. The forward face of the sleeve 26 is then polished at the same angle as the back face of the GRIN lens 28. Anti-reflection coatings are deposited on the forward face of the sleeve 26 and the back face of the GRIN lens 28. The front face of the sleeve 26 and the back face of the GRIN lens 28 are then brought together in close proximity with the angle of their faces in parallel and reciprocal relationship. Separation distance is 5 to 10 micrometers. The sleeve 26 and GRIN lens 28 are held in place by a UV-cured epoxy 76, or by a solder.

As shown in FIG. 9B, the sleeve 26 is placed in a quartz cylinder 78 which holds the ends of the optical fibers 22, the sleeve 26, and the GRIN lens 28 centered in a cylindrical housing 80 of stainless steel. The housing 80 forms the outer cover of the sleeve assembly 18. Epoxy 82, such as model 4481 from Electro-Lite Company, Danbury, Conn., holds the sleeve assembly 18 together.

Figures 10, 11:
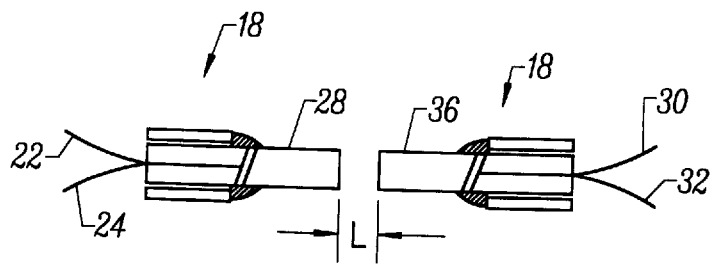
FIGS. 10 and 11 illustrate the effects of the separation gap between the collimating lenses on insertion loss for the switches of the present invention.

The sleeve assemblies are mounted onto switch body 14 as illustrated in FIG. 9C. The switch body has coaxial passages which accept the GRIN lenses 28 and 36, and the two-sleeve assemblies 18 can generally be aligned by monitoring the coupling efficiency between first input fiber 22 and second output fiber 32, and also between second input fiber 30 and first output fiber 24. Gap 38 should be sufficiently large to allow adjustment of the position of the movable mirror 20 between the GRIN lenses. However, as illustrated in FIGS. 10 and 11, the gap or axial distance L between the GRIN lenses can have a significant effect on insertion loss across the switch. For this reason, the gap is preferably less than about 2.0 mm.

Once the sleeve assemblies are properly positioned in switch body 14, they are fixed in place using adhesive, solder, or the like. The switch body and relay can then be mounted on support base 16, and the relay arm 40 bent to align mirror 20 as described above. Alternatively, one of the relay and the switch body can be fixed to the support base, and the other moved relative to the support base until proper alignment is achieved. Preferably, a very small relay, such as those commercially available from Fujitsu, Inc., located at Tokyo, Japan, is used. Preferably, the entire 2×2 switch 10 is less than 40 mm long, 20 mm tall, and 30 mm wide. The switch can then be hermetically sealed to prevent environmental degradation and maintain switching performance.

While switches having sleeves holding 2, 3, and 4 fibers have been described, still further alternative switch structures may be provided. Additionally, conventional homogeneous lenses might also be used in place of the GRIN lenses in the switch, though GRIN lenses are believed to be superior in the balance of factors, such as size, cost, performance, and reliability considerations. Nonetheless, conventional collimating lenses, including homogeneous and aspheric lenses, might be used in place of the quarter pitch GRIN lenses. As mentioned above, the pitch of the GRIN lenses may be slightly less, or slightly more, than a true quarter pitch, so that the light from each of the input fibers is not refocused to a point. In some embodiments, the ends of the output fibers may be formed with a properly enlarged core to increase the transfer of light from the corresponding input fibers, and to keep the fractional loss low. Suitable fibers with properly enlarged cores include thermally expanded core optical fibers available from Sumitomo Osaka Cement, Ltd., of Japan.

If additional functions are required to be integrated into the switch, fiber optic elements can be easily inserted into the optical path between the quarter pitch GRIN lenses of the switches of FIGS. 1, 5A, 6A, and 7. For example, wavelength division multiplexed switches may be provided by replacing mirror 20 with a partially reflective filter, such as those described in co-pending U.S. patent application Ser. No. 08/470,815, now abandoned previously incorporated herein by reference.

While the description above provides a full and complete disclosure of the preferred embodiments of the present invention, various modifications, alternate constructions, and equivalents will be obvious to those with skill in the art. Thus the scope of the present invention is limited solely by the appended claims.

What is claimed is:

1. A method for switching optical signals, the method comprising:

transmitting a first optical signal along an optical path from a first input optical fiber;

collimating the first signal from the first input fiber with a first lens;

reflecting the first signal back through the first lens with a movable reflector so that the first lens focusses the first signal into a first output fiber;

moving the movable reflector out of the optical path of the first signal so that the first signal from the first lens passes into a second output fiber.

2. The switching method of claim 1, further comprising focussing the first signal from the first lens into the second output fiber with a second lens when the movable reflector is out of the optical path of the first signal.

3. The switching method of claim 2, further comprising:

transmitting a second optical signal from a second input fiber;

collimating the second signal from the second input fiber with the second lens; and reflecting the second signal back through the second lens with the movable reflector so that the second lens focusses the second signal into the second output fiber; and wherein the moving step also moves the movable reflector out of the optical path of the second signal so that the second signal from the second lens is focussed by the first lens into the first output fiber.

4. The switching method of claim 3, further comprising:

transmitting a third optical signal from a third input fiber;

transmitting a fourth optical signal from a fourth input fiber;

collimating the third signal from the third input fiber with the first lens; and collimating the fourth signal from the fourth input fiber with the second lens; and reflecting the third signal back through the first lens with the movable reflector so that the first lens focusses the third signal into a third output fiber;

reflecting the fourth signal back through the second lens with the movable reflector so that the second lens focusses the fourth signal into the fourth output fiber; and wherein the moving step also moves the movable reflector out of the optical path of the third and fourth signals so that the third and fourth signals are focussed into the fourth and third output fibers, respectively.

5. The switching method of claim 1, wherein the moving step comprises applying an electrical potential to a relay so that the relay moves the movable reflector.

6. The switching method of claim 5, wherein the movable reflector comprises a mirror defining a plane, wherein the plane of the mirror is substantially parallel to an adjacent surface of the first lens, and wherein the relay moves the mirror substantially parallel to the plane of the mirror.

7. The switching method of claim 1, further comprising reflecting the first signal from the first lens with a fixed reflector when the movable reflector is out of the optical path of the first signal, wherein the fixed reflector directs the first signal back through the first lens so that the first lens focusses the first signal into the second output fiber.

8. A method for switching two optical signals, the method comprising:

transmitting a first optical signal along an optical path from a first input optical fiber;

collimating the first signal from the first input fiber with a first GRIN lens;

reflecting the first signal back through the first GRIN lens with a movable reflector so that the first GRIN lens focusses the first signal into a first output fiber;

transmitting a second optical signal along an optical path from a second input optical fiber;

collimating the second signal from the second input fiber with a second GRIN lens;

reflecting the first signal back through the second GRIN lens with the movable reflector so that the second GRIN lens focusses the second signal into a second output fiber;

moving the movable reflector out of the optical paths of the first and second signals so that the first signal from the first GRIN lens is focussed into the second output fiber by the second GRIN lens, and so that the second signal from the second GRIN lens is focussed into the first output fiber by the first GRIN lens.

* * * * *